United States Patent [19]

Colchester et al.

[11] 3,723,444

[45] Mar. 27, 1973

[54] MANUFACTURING OF BIPYRIDYLIUM SALTS

[75] Inventors: John Edward Colchester; Thomas Blundell, both of Runcorn, England

[73] Assignee: Imperial Chemical Industries Limited, London, England

[22] Filed: June 16, 1969

[21] Appl. No.: 833,710

[30] Foreign Application Priority Data

July 1, 1968 Great Britain......................31,366/68

[52] U.S. Cl..............260/295 AM, 260/296 D, 71/94
[51] Int. Cl. ..............................................C07d 31/22
[58] Field of Search..............................260/295, 296

[56] References Cited

UNITED STATES PATENTS 3,405,135   10/1968   Colchester et al.....................260/296

*Primary Examiner*—Harry I. Moatz
*Attorney*—Cushman, Darby & Cushman

[57] ABSTRACT

A process for the manufacture of a 1,1'-disubstituted-4,4'-bipyridylium salt which comprises reacting an N-substituted-4-cyano pyridinium salt with ammonia or an alkali metal hydroxide and subsequently oxidizing the resulting interaction product.

34 Claims, No Drawings

MANUFACTURING OF BIPYRIDYLIUM SALTS

This invention relates to the manufacture of bipyridylium salts and particularly to a process for the manufacture of 1,1'-disubstituted-4,4'-bipyridylium salts which are useful herbicides.

According to the present invention we provide a process for the manufacture of a 1,1'-disubstituted-4,4'-bipyridylium salt which comprises reacting an N-substituted-4-cyano-pyridinium salt with ammonia or an alkali metal hydroxide and subsequently oxidizing the interaction product.

The reaction can be carried out simply by mixing the reagents and heating the mixture if desired, but we prefer to carry out the reaction in the presence of a solvent in which both reactants are soluble. A particularly suitable solvent is water, especially since ammonia or an alkali metal hydroxide is usually employed in the form of an aqueous solution. However, a wide variety of organic solvents may be used if desired. Examples of suitable organic solvents are ethers, for example tetrahydrofuran and 1,4-dioxane; ketones, for example acetone; organic bases, for example pyridine; amides, particularly tertiary alkylamides, for example dimethyl formamide; sulphoxides, for example dimethyl sulphoxide; sulphones, for example sulpholane; nitriles, for example acetonitrile; alcohols, for example ethanol; nitro compounds, for example nitropropane; and alkyl carbonates and sulphates, for example propylene carbonate and dimethyl sulphate. Mixtures of solvents may be used if desired.

The temperature at which the reaction is carried out is not critical and can be, for example, from 0°C to 150°C, especially from 10°C to 100°C. We prefer to carry out the reaction at from 10°C to 50°C. The apparent pH of the reaction mixture is initially greater than 7 and is preferably greater than 9. Bipyridylium salts tend to be unstable in the presence of alkali and consequently we prefer to allow the apparent pH of the reaction mixture to rise during the reaction to less than 9.

Any N-substituted-4-cyano-pyridinium salt may be converted to a bipyridylium salt by the process and particularly suitable salts are those having an alkyl or a carbamidoalkyl substituent on the nitrogen atom of the pyridine nucleus. Alkyl groups containing up to 10 carbon atoms and especially from one to four carbon atoms are preferred. The carbamidoalkyl substituent has the formula $-R_1-CO-_{NR_2}R_3$ wherein $R_1$ is a hydrocarbon radical (especially the methylene radical) and $R_2$ and $R_3$ are hydrocarbon or substituted hydrocarbon radicals and wherein $R_2$ and $R_3$ may, together with the attached nitrogen atom make up a heterocyclic ring. The salt is conveniently a halide and especially a chloride salt, though other salts may be used if desired. The pyridine nucleus may be substituted, for example by alkyl groups in 2, 3, 5 or 6-position.

The reaction between the 4-cyano-pyridinium salt and the ammonia or alkali metal hydroxide results in the liberation of cyanide ions into the reaction mixture and these anions are preferably prevented from reacting with the interaction product as soon as is possible after this product has been formed.

The 1,1'-disubstituted-4,4'-bipyridylium salt is obtained from the interaction product by oxidation which may be achieved by air or a variety of oxidizing agents under acidic conditions, for example ceric sulphate in dilute sulphuric acid. Suitable oxidizing agents, which may be organic or inorganic compounds are electron acceptors and have a redox potential in water more positive than −0.50 volts as compared with the saturated calomel electrode. Examples of suitable oxidizing agents are ceric sulphate (in dilute sulphuric acid); metal salts, especially the halide; inorganic oxyacid anhydrides, especially sulphur dioxide; chlorine; air, preferably in conjunction with water and/or carbon dioxide and/or an acid for example acetic acid or sulphuric acid; and organic oxidizing agents for example quinones such as benzoquinone, chloranil and anthraquinone. The oxidation is advantageously carried out under acidic conditions, the apparent pH of the reaction mixture being preferably less than 7, especially from 4 to 6. Addition of the oxidizing agent in an acidic medium is usually sufficient to achieve this result.

It is usually necessary to isolate the final bipyridylium salt from free cyanide ions in the reaction mixture, for example if the intermediate reaction product is oxidized without first isolating it from the inter-mediate reaction reaction mixture. We have that 1,1'-disubstituted-4,4'-bipyridylium cations can be separated from the cyanide ions in the reaction mixture by treating the mixture with 4,4'-diamino-stilbene-2,2'-disulphonic acid which is commonly known as "amsonic acid". The bipyridylium cation is thereby precipitated from the mixture in the form of its amsonate salt whilst the cyanide ions remain in the mixture. The precipitate can then be removed by filtration, washed and dried in conventional manner and the amsonic acid can be regenerated and recovered for re-use by acidification of the amsonate salt, preferably employing an aqueous solution of an acid. The acid used to recover the amsonic acid can be selected so as to provide the desired anion for the resulting bipyridylium salt and can be for example hydrochloric acid, phosphoric acid or acetic acid.

Amsonic acid is only sparingly soluble in water and it is therefore usually employed in the present invention in the form of an aqueous solution of one of its water-soluble salts, conveniently an alkali metal salt or the ammonium salt. The treatment of the reaction mixture with amsonic acid can be conveniently at a pH in the range 7 to 12, and at a temperature of from 0°C to 100°C.

The 1,1'-disubstituted-4,4'-bipyridylium cation can also be separated from cyanide ions in the reaction mixture by contacting this mixture with a suitable cation-exchange resin. In this way the cyanide ions pass the resin and remain in the mixture so that they are separated from the bipyridylium cation. The bipyridylium cation can be subsequently be liberated from the ion-exchange resin by treatment of the resin with an acid. In this way a bipyridylium salt is obtained wherein the anion is that supplied by the acid. Examples of the anions which may be introduced into the mixture in this way are chlorine, sulphate and acetate ions.

Alternatively, the cyanide ions can be removed from the bipyridylium cations using an anion-exchange resin.

The temperature at which the mixture is contacted with the ion-exchange resin is not critical but can conveniently be from 0°C to 100°C. Examples of suitable cation-exchange resins are the Zeocarb cation exchanges resins, for example Zeocarb 225 (SRC-8), the Amberlite cation exchange resins for example Amberlite Resin C6–120, and the Deacidite resins. An example of an anion exchange resin which can be used is Amberlite IRA 400.

A further method of removing cyanide ions from the reaction mixture containing the 1,1'-disubstituted-4,4'-bipyridylium salt is to acidify and then de-gas the reaction mixture. In this way the cyanide ions are removed from the mixture in the form of hydrogen cyanide and the process is particularly convenient since the hydrogen cyanide so liberated can be reacted directly with a base, for example sodium hydroxide, to form a cyanide which can be used to prepare a further quantity of the bipyridylium cation. Any mineral or organic acid can be used which results in the formation of hydrogen cyanide and examples of suitable acids are hydrochloric, sulphuric, phosphoric and acetic acids. Alternatively the solution can be acidified by means of sulphur dioxide. The acid used can be selected to provide the required anionic species in the final 1,1'-disubstituted-4,4'-bipyridylium salt.

Acidification of the reaction mixture can be effected at any temperature at which the bipyridylium cation is stable, for example from 0°C to 100°C. The mixture can be de-gassed in conventional manner, for instance by bubbling air or an inert gas through it under vacuum or by boiling the mixture. It will be appreciated that this technique of acidification followed by de-gassing of the mixture is simple to carry out and can be employed to remove from the mixture any anion which forms with a proton a volatile product which can be removed from the mixture by de-gassing. In addition to cyanide ions, halide ions, especially fluoride and chlorine ions can be removed by the technique.

Cyanide anions can also be in effect removed from mixtures containing 1,1'-disubstituted-4,4'-bipyridylium cations by addition to the mixtures at a temperature of from 0°C to 100°C of a reagent which forms a complex salt with the cyanide ions. For example the addition of ferric or ferrous ions in the form of a salt for example a sulphate or halide salt results in the formation of a ferrocyanide. In this case the cyanide ions are not actually removed from the reaction mixture but they are effectively prevented from reacting with the bipyridylium salt by virtue of their being in the form of a complex salt with the added cations.

The 1,1'-disubstituted-4,4'-bipyridylium salt may also be recovered from the reaction mixture by conventional separation processes, for example by extraction of the mixture with water or a dilute aqueous solution of an acid, for example sulphuric, hydrochloric, phosphoric or acetic acid. The aqueous phase can then be separated and the salt may be recovered from the aqueous phase by evaporation of the water and crystallization of the salt.

The invention is illustrated but in no way limited by the following examples:

EXAMPLE 1

A solution of potassium hydroxide in methanol was added to an aqueous solution of N-methyl-4-cyanopyridinium iodide at room temperature under an atmosphere of nitrogen. The resulting solution had a blue coloration, and the color gradually changed through red to brown. The electron spin resonance (ESR) of the brown mixture indicated the presence of 1,1'-dimethyl-4,4'-bipyridylium cation radical.

The mixture was then treated with excess ceric sulphate in dilute sulphuric acid as oxidizing agent to yield 1,1'-dimethyl-4,4'-bipyridylium ion the presence of which was indicated by colorimetric analysis.

EXAMPLE 2

A mixture containing 1,1'-dimethyl-4,4'-bipyridylium cations, methyl pyridinium ions and cyanide ions and other impurities was neutralized (pH 7) by addition of dilute sulphuric acid.

A neutral aqueous solution of the disodium salt of amsonic acid was added to the above neutralized mixture with stirring. The resulting mixture became dark in color and a black precipitate of 1,1-dimethyl-4,4'-bipyridylium amsonate was formed. The precipitate was filtered off and washed with water and then dried in air. Analysis indicated that the black solid so obtained had a purity of greater than 98 percent, and cyanide ions could not be detected in it.

The black solid was then treated with a dilute aqueous solution of sulphuric acid, yielding a yellow solid and a clear solution. The solid, identified as amsonic acid, was filtered off and the remaining solution was analyzed. The solution contained 1,1'-dimethyl-4,4'-bipyridylium cations in an amount representing a near quantitative recovery of this cation from the initial mixture. The solution was free from cyanide ions and methyl pyridinium ions.

EXAMPLE 3

A mixture containing 1,1'-dimethyl-4,4'-bipyridylium cations and cyanide ions was neutralized by adding dilute hydrochloric acid solution. A steady stream of nitrogen gas was bubbled through the mixture which was heated to about 100°C for 30 minutes during which time hydrogen cyanide was detected in the stream of nitrogen leaving the reaction vessel. The mixture was then allowed to cool and analysis of the cooled mixture indicated that the amount of 1,1'-dimethyl-4,4'-bipyridylium cation was the same as in the original impure mixture. Cyanide ions could not be detected in the final mixture.

EXAMPLE 4

A mixture containing 1,1'-dimethyl-4,4'-bipyridylium cations and cyanide ions was neutralized by adding dilute aqueous hydrochloric acid solution. The mixture was then added to an aqueous solution of sodium hypochlorite at a pH below 9. Analysis of the resulting mixture failed to detect the presence of cyanide ions and showed that the amount of 1,1'-dimethyl-4,4'-bipyridylium cations was the same as in the original mixture.

EXAMPLE 5

A mixture containing 1,1'-dimethyl-4,4'-bipyridylium cations and cyanide ions was neutralized by adding a dilute aqueous solution of hydrochloric acid. The mixture was then mixed with an aqueous solution of ferrous sulphate heptahydrate containing a slight molar excess of the heptahydrate with respect to cyanide ions in the mixture being treated. Free cyanide ions could not be detected in the mixture from which a small quantity of ferrocyanide was removed by filtration.

EXAMPLE 6

A mixture containing 1,1'-dimethyl-4,4'-bipyridylium cations and cyanide ions was passed down an anion exchange column comprised by Deacidite FF resin. The solution recovered from the base of the column contained no detectable amounts of cyanide ions. The amount of 1,1'-dimethyl-4,4'-bipyridylium cation in the mixture was unchanged.

EXAMPLE 7

A mixture containing 1,1'-dimethyl-4,4'-bipyridylium cations and cyanide was passed down an ion exchange column comprised by Zeocarb 225 (SRC-8) Resin. The solution recovered from the base of the column contained cyanide ions but was free from 1,1'-dimethyl-4,4'-bipyridylium cations.

After removal of the cyanide ion-containing solution, N/10 aqueous hydrochloric acid was passed down the column and the solution recovered from the base of the column was found by analysis to contain 1,1'-dimethyl-4,4'-bipyridylium cations in an amount representing a quantitative recovery of these ions from the initial mixture.

What we claim is:

1. A process for the manufacture of a 1,1'-disubstituted-4,4'-bipyridylium salt wherein the substituents are hydrocarbon alkyl of up to 10 carbon atoms and carbamidoalkyl of the formula —$CH_2$·CO—$NR_2R_3$ where $R_2$ and $R_3$ are hydrocarbon alkyl of up to 10 carbon atoms and may together with the attached nitrogen atom make up a heterocyclic ring, which comprises reacting a solution of the corresponding N-substituted 4-cyano pyridinium salt with a base selected from the group consisting of ammonium hydroxide and an alkali metal hydroxide at an initial pH of greater than 7 and subsequently oxidizing the resulting interaction product under acidic conditions by means of an oxidizing agent which is an electron acceptor and which has a redox potential in water more positive than −0.05 volt as compared with a saturated calomel electrode or air.

2. A process as claimed in claim 1 wherein the solvent is an aqueous medium.

3. A process as claimed in claim 2 wherein the solvent is water.

4. A process as claimed in claim 1 wherein an organic solvent is employed.

5. A process as claimed in claim 1 wherein the reaction is carried out at temperature of from 0°C to 150°C.

6. A process as claimed in claim 5 wherein the temperature is from 10°C to 100°C.

7. A process as claimed in claim 6 wherein the temperature is up to 50°C.

8. A process as claimed in claim 1 wherein the base is potassium hydroxide.

9. A process as claimed in claim 1 wherein the base is ammonium hydroxide.

10. A process as claimed in claim 1 wherein the initial pH of the reaction mixture is greater than 9.

11. A process as claimed in claim 10 wherein the pH is allowed to rise during the reaction to less than 9.

12. A process as claimed in claim 1 wherein the oxidation is carried out at a pH of from 4 to 6.

13. A process as claimed in claim 1 wherein the interaction product is oxidized by means of air.

14. A process as claimed in claim 13 wherein air is employed in conjunction with water.

15. A process as claimed in claim 13 wherein air is employed in conjunction with an acid.

16. A process as claimed in claim 1 wherein an inorganic oxidizing agent is employed.

17. A process as claimed in claim 16 wherein the oxidizing agent is a metal salt.

18. A process as claimed in claim 17 wherein the oxidizing agent is ceric sulphate.

19. A process as claimed in claim 16 wherein the oxidizing agent is an organic oxyacid anhydride.

20. A process as claimed in claim 19 wherein the inorganic oxyacid anhydride is sulphur dioxide.

21. A process as claimed in claim 16 wherein the oxidizing agent is chlorine.

22. A process as claimed in claim 1 wherein an organic oxidizing agent is employed.

23. A process as claimed in claim 22 wherein a quinone is employed.

24. A process as claimed in claim 1 wherein the interaction product is oxidized without first being isolated from the reaction mixture.

25. A process as claimed in claim 1 wherein after oxidation of the interaction product to the bipyridylium salt, the reaction mixture contains free cyanide ions and the bipyridylium cation is separated from the free cyanide ions by acidifying the reaction mixture and heating the acidified mixture to remove hydrogen cyanide gas.

26. A process as claimed in claim 1 wherein after oxidation of the interaction product to the bipyridylium salt, the reaction mixture contains free cyanide ions and the reaction mixture is treated at a pH of 7 to 12 with a water soluble alkali metal salt of amsonic acid to precipitate the bipyridylium cation form of the bipyridylium salt of amsonic acid.

27. A process as claimed in claim 26 wherein the treatment with the salt of amsonic acid is carried out at a pH in the range 7 to 12.

28. A process as claimed in claim 25 wherein a mineral acid, acetic acid or sulphur dioxide are employed to acidify the reaction mixture.

29. A process as claimed in claim 28 wherein separation of the bipyridylium cation from free cyanide ions is carried out at a temperature of from 0°C to 100°C.

30. A process as claimed in claim 1 wherein the alkyl group contains from one to four carbon atoms.

31. A process as claimed in claim 30 wherein the N-substituted-4-cyano-pyridinium salt is an N-methyl-4-cyano-pyridinium salt.

32. A process as claimed in claim 1 wherein the N-substituted-4-cyano-pyridinium salt is an N-carbamidomethyl-4-cyanopyridinium salt.

33. A process as claimed in claim 1 wherein the pyridine nucleus of the N-substituted-4-cyano-pyridinium salt has at least one substituent in the 2-, 3-, 5- or 6- position.

34. A process as claimed in claim 1 wherein the N-substituted-4-cyano-pyridinium salt is an N-substituted-4-cyano-pyridinium chloride.

* * * * *